(12) United States Patent
Hangarter et al.

(10) Patent No.: US 11,029,244 B1
(45) Date of Patent: Jun. 8, 2021

(54) ELECTROCHEMICAL ZRA TEST CELLS FOR DETERMINATION OF GALVANIC CORROSION RATES IN ATMOSPHERIC ENVIRONMENTS

(71) Applicant: The Government of the United States of America, as represented by the Secretary of the Navy, Arlington, VA (US)

(72) Inventors: Carlos M. Hangarter, Alexandria, VA (US); Steven A. Policastro, Waldorf, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 50 days.

(21) Appl. No.: 16/172,490

(22) Filed: Oct. 26, 2018

Related U.S. Application Data

(60) Provisional application No. 62/577,362, filed on Oct. 26, 2017.

(51) Int. Cl.
| | | |
|---|---|---|
| *G01N 17/02* | (2006.01) | |
| *G01N 27/04* | (2006.01) | |
| *G01N 17/00* | (2006.01) | |
| *G01N 17/04* | (2006.01) | |

(52) U.S. Cl.
CPC .......... *G01N 17/02* (2013.01); *G01N 17/006* (2013.01); *G01N 17/043* (2013.01); *G01N 27/041* (2013.01)

(58) Field of Classification Search
None
See application file for complete search history.

(56) References Cited

U.S. PATENT DOCUMENTS

| | | | | |
|---|---|---|---|---|
| 3,065,151 A | * | 11/1962 | Schaschl et al. | ...... G01N 17/02 205/777 |
| 5,411,890 A | | 5/1995 | Falat | |

FOREIGN PATENT DOCUMENTS

| | | | | |
|---|---|---|---|---|
| JP | 2014139547 A | * | 7/2014 | ............. G01N 17/02 |

OTHER PUBLICATIONS

Hangarter et al. "Microelectrode test configurations for measurement of galvanic corrosion current under saline drops in simulated atmospheric conditions" PRIME ECS Annual Meeting (Oct. 5, 2016).

Hangarter et al. "Microelectrode test configurations for measurement of galvanic corrosion current under saline drops in simulated atmospheric conditions" ECS Transactions, 75 29) 11-22 (2017).

* cited by examiner

*Primary Examiner* — J. Christopher Ball
(74) *Attorney, Agent, or Firm* — US Naval Research Laboratory; Joseph T. Grunkemeyer

(57) ABSTRACT

The invention is directed to a real-time, zero resistance ammeter (ZRA) galvanic corrosion detection instrument that is adapted to measure corrosion under atmospheric conditions. The instrument may be used in accordance with methods for selecting materials based on environmental conditions and electrolyte chemistries. The electrochemical ZRA test cell of the invention may further be used to determine galvanic corrosion susceptibility, aid in forecasting corrosion, and determine the extent of corrosion based on environmental factors.

23 Claims, 6 Drawing Sheets

ELECTROCHEMICAL ZRA TEST CELLS FOR DETERMINATION OF GALVANIC CORROSION RATES IN ATMOSPHERIC ENVIRONMENTS

CROSS-REFERENCE TO RELATED APPLICATIONS

This application claims priority to U.S. Provisional Application No. 62/577,362, filed on Oct. 26, 2017, the contents of which are incorporated herein by reference in their entirety.

TECHNICAL FIELD

The invention relates generally to real-time, zero resistance ammeter (ZRA) galvanic corrosion detection instruments that are adapted to measure corrosion under atmospheric conditions. The instrument may be used in accordance with methods for selecting materials based on environmental conditions and electrolyte chemistries. The electrochemical ZRA test cell of the invention may further be used to determine galvanic corrosion susceptibility, aid in forecasting corrosion, and determine the extent of corrosion based on environmental factors.

BACKGROUND OF THE INVENTION

Atmospheric corrosion is characterized by thin film and discontinuous electrolytes that behave in fundamentally different ways than bulk electrolytes. These differences arise due to their finite volumes, which limit availability of ionic species and permit the accumulation of corrosion products that can then impact reaction kinetics.

Typical corrosion mitigation strategies, such as the use of inhibitors, surface primers, and coatings, are designed to prevent localized or self-corrosion. However, galvanic corrosion is an electrochemical process in which one metal corrodes preferentially when it is in contact with another metal, in the presence of an electrolyte. Galvanic corrosion is often a severe form of corrosion, and may be unavoidable due to strength-to-weight ratio requirements and other material property requirements. This is particularly an issue for structures and vehicles such as aircraft, in which corrosion may be highly localized at fasteners used to hold panel and frame materials.

To perform ZRA measurements, electrode couples must be electrically disconnected, but electrolytically connected in a cell, such that a potentiostat controls and monitors the electrical connection between the two alloys. Typical methods for transient electrochemical analysis of galvanic couples utilize one of two approaches to make electrode pair assemblies: microfabrication, and mounting electrodes in an epoxy.

Microfabrication generally utilizes masks and vapor deposition or screen-printing to create interdigitated electrodes consisting of different metals. However, these synthesis techniques can only be used to produce metals or alloys with limited constituents. Moreover, the microstructural complexity responsible for the mechanical and chemical properties of structural alloys is largely process dependent, which is not captured with these alternate synthesis approaches.

Mounting electrodes in epoxy, which can include the use of electrode stacks, utilizes non-conductive polymers to prevent the two materials from electrically shorting, while creating a flat surface by means of surface grinding. Mounting alloy coupons is a standard method known in the art of metallographic preparation and can be easily tailored to include two alloys or more. This can include an electrode stack, which is an alternating structure of two types of alloys of interest separated by thin sheets of non-conducting polymers (such as polytetrafluoroethylene). While mounted configurations enable ZRA measurements to be performed, the use of polymers can impact wetting mechanics of thin films and droplets.

Critically, however, these methods employ configurations that intertwine kinetics with reaction product interactions. These approaches present convoluted responses to system conditions and the evolving chemical interactions that impact transient galvanic corrosion rates.

The ability to obtain accurate electrochemical corrosion measurements over a range of conditions is important in understanding material interactions and making accurate time-of-service predictions for atmospheric environments, and there is a need in the art for methods and apparatus for providing electrochemical corrosion measurements.

SUMMARY OF THE INVENTION

The invention described herein, including the various aspects and/or embodiments thereof, meets the unmet needs of the art, as well as others, by providing real-time, zero resistance ammeter (ZRA) galvanic corrosion detection instruments that are adapted to measure corrosion under atmospheric conditions. The instrument may be used in accordance with methods for selecting materials based on environmental conditions and electrolyte chemistries. The electrochemical ZRA test cell of the invention may further be used to determine galvanic corrosion susceptibility, aid in forecasting corrosion, and determine the extent of corrosion based on environmental factors.

According to one aspect of the invention, a zero-resistance ammeter (ZRA) galvanic atmospheric corrosion kinetics (GACK) detection instrument is provided, which includes an anode; a cathode; an electrolyte provided at the anode; an electrolyte provided at the cathode; a salt bridge electrolytically-connecting the electrolyte at the anode with the electrolyte at the cathode; and a ZRA electrically-connecting the anode and the cathode.

According to another aspect of the invention, a method is provided for measuring corrosion under atmospheric conditions, which includes providing an anode, a cathode, and separated electrolytes at the anode and cathode; providing a salt bridge in which a first end of the salt bridge contacts the electrolyte at the anode, and a second end of the salt bridge contacts the electrolyte at the cathode, forming a separated electrolytes galvanic couple; providing a zero resistance ammeter that is electrically connected to the anode and cathode; measuring corrosion current density of the separated analytes galvanic couple using the zero resistance ammeter; and comparing the corrosion current density to an intersection point of polarization scans obtained by a zero resistance ammeter connected to the anode and cathode in the absence of the separated electrolytes. When the corrosion current density of the separated electrolytes galvanic couple is higher than the intersection point of the polarization scans, the presence of the separated electrolytes causes accelerated corrosion of the anode as compared to corrosion of the anode in the absence of the electrolyte.

The methods of the invention may be used to select materials based on environmental conditions, and/or to determine when the selected materials should be replaced to prevent equipment failure.

DETAILED DESCRIPTION OF THE INVENTION

The invention described herein, including the various aspects and/or embodiments thereof, meets the unmet needs of the art, as well as others, by providing a real-time, zero resistance ammeter (ZRA) galvanic atmospheric corrosion kinetics (GACK) detection instruments that are adapted to measure corrosion under atmospheric conditions. The instrument may be used in accordance with methods for selecting materials based on environmental conditions and electrolyte chemistries. The electrochemical ZRA test cell of the invention may further be used to determine galvanic corrosion susceptibility, and measure the extent of existing corrosion.

Figure 1:
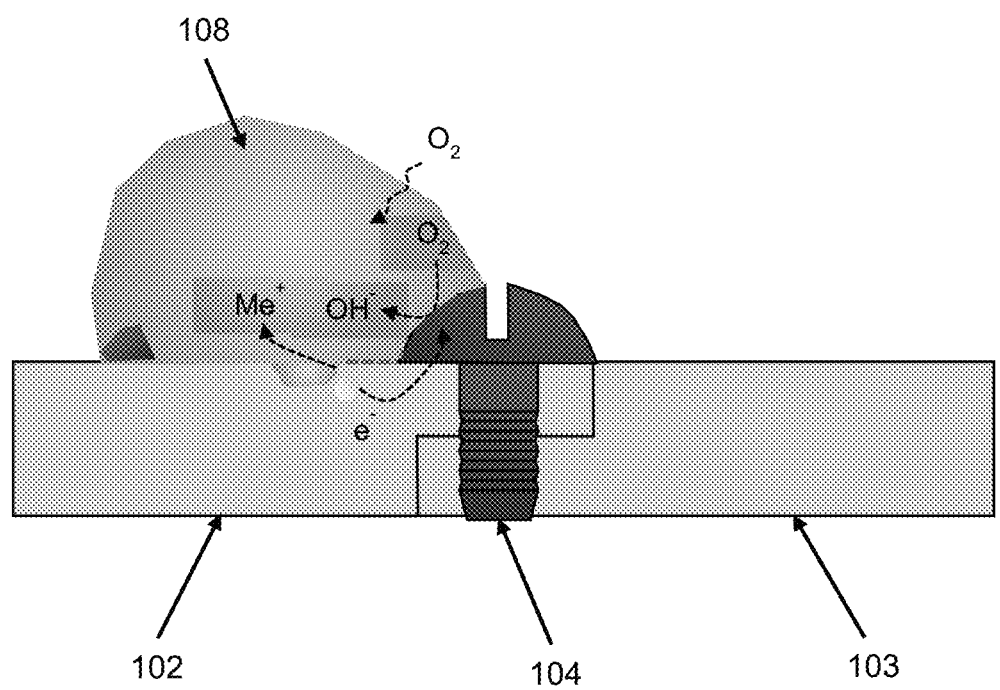
FIG. 1 depicts a structure undergoing galvanic corrosion.

The ability to determine galvanic corrosion rates in environments that are relevant for the structure or vehicle being designed permits better-informed material selection during the design phase, and allows for more accurate time-of-service predictions for condition-based maintenance schedules. As illustrated in FIG. 1, galvanic corrosion can occur when panels 102, 103 formed from a first metal are fastened by a fastener 104 formed from a second metal that is different from the first metal. When an electrolyte is present, such as water droplet 108, corrosion reactions occur that degrade the first metal, eventually leading to failure of the structure. It would be beneficial to measure the reactions to determine when maintenance or replacement of the panels 102, 103 and/or fasteners 104 should be performed to prevent structural failure.

Zero resistance ammeter (ZRA) measurements have been recognized for their utility in characterizing galvanic corrosion rates. In marine galvanic corrosion, these measurements are used to determine galvanic corrosion rates and to observe transient behavior that typically arises from geometric and passive layer changes. However, transient electrochemical behavior is more significant for atmospheric corrosion. The temperature and chloride concentration of a body of seawater is relatively stable compared to the dynamic environmental conditions associated with diurnal cycles, intermittent wetting, and atmospheric chemistry that comprise typical atmospheric corrosion environments.

Atmospheric corrosion rates may vary depending on the material, as well as the chemical composition of the atmosphere, and the composition of the electrolyte solution contributing to the corrosion. Although the composition of air (78.09% nitrogen, 20.95% oxygen, 0.93% argon, and 0.04% $CO_2$, with an average of 1% water vapor at sea level) and the ionic composition of seawater (19,980 mg/L $Cl^-$, 10,556 mg/L $Na^+$, 2,649 mg/L $SO_4^{2-}$, 1,262 mg/L $Mg^{2+}$, 400 mg/L $Ca^{2+}$, 380 mg/L $K^+$, 140 mg/L $HCO_3^-$, 65 mg/L $Br^-$, 26 mg/L $BO_3^{3-}$, 1 mg/L $F^-$, 1 mg/L $SiO_3^{2-}$, and <1 mg/L $I^-$) are generally well characterized, the composition of a given electrolyte solution in contact with a structural member may vary widely. This is due, for example, to temperature and humidity cycling, local pollutants, and confinement of corrosion products generated due to galvanic corrosion of the material. For example, the electrolyte concentrations found in droplets and thin films of seawater can vary over orders of magnitude from solutions more dilute than seawater, to dry salt crystals. Additionally, the thin, small electrolyte volumes in atmospheric corrosion experience different oxygen transport rates, rapidly changing surface conditions, and unique electrolyte chemistry from reaction product confinement, all of which contribute to complex transient galvanic corrosion rates in atmospheric environments.

Figure 2:
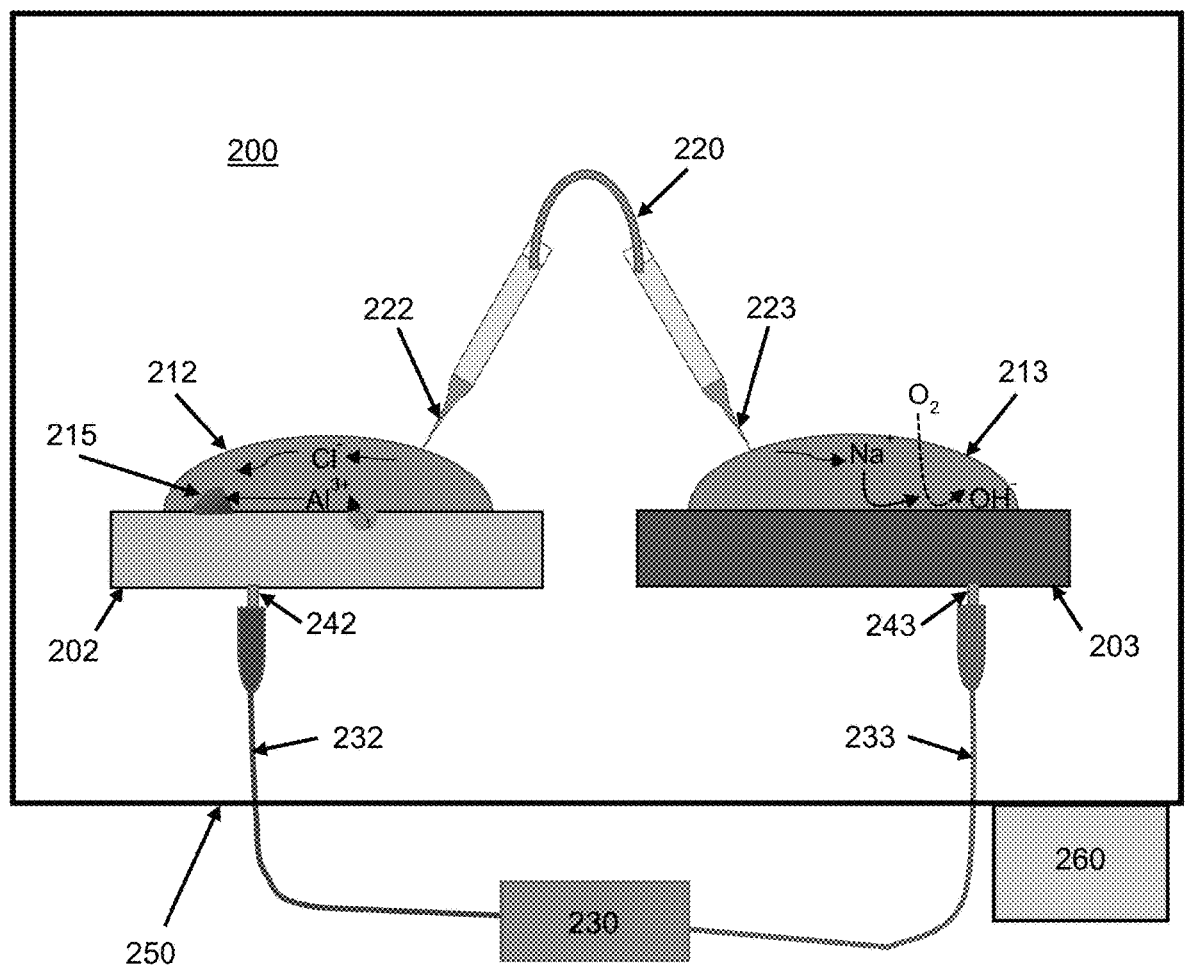
FIG. 2 depicts a ZRA GACK detection instrument in which oxidation and reduction reactions are decoupled from one another. The droplets on the two alloys are connected via a salt bridge to permit ionic conduction, while preventing corrosion product transfer.

As shown in FIG. 2, the ZRA GACK detection instrument 200 includes an anode 202, a cathode 203, and an electrolyte, where the electrolyte at the anode is referred to as the anolyte 212, the electrolyte at the cathode is referred to as the catholyte 213. The electrochemical energy may be measured at the anode 202 and cathode 203 by electrically connecting them to a commercially-available potentiostat or ZRA apparatus 230, for example, the Gamry Instruments Reference 600™ (potentiostat available from Gamry Instruments, Warminster, Pa.). Electrically-conductive cables 232, 233 may be used to attach the potentiostat to the anode and cathode, for example, using alligator clips, clamps, or other suitable attachment mechanisms 242, 243.

The anode 202 and cathode 203 may be formed from any metals or alloys of interest that are suspected of undergoing galvanic corrosion when used in contact with one another in an environment of interest. Examples of metals and alloys that may be selected as anode and cathode materials include, but are not limited to, aluminum, titanium, nickel, steel (particularly stainless steel), cobalt, chromium, and super-alloys (such as Inconel, Hastelloy, Waspaloy, and Rene alloys).

In some aspects of the invention, the anode may be an aluminum alloy, which may be used, for example, as an aircraft body panel. The cathode may be a stainless steel alloy, which may be used, for example, to fasten aircraft body panels to an airframe. The electrolyte may be based on seawater, including sodium chloride and optionally containing one or more additional ions that may be encountered in the operating environment where the metals and/or alloys will be employed.

The anolyte 212 and catholyte 213 used in the test cells of the invention are preferably aqueous solutions containing salts or solvents of interest. They may be provided as droplets or thin films, with the overall electrolyte geometry being controlled, for example, by coupon masks, initial volume, and concentration. Exemplary electrolytes for use in the ZRA GACK detection instrument may be selected from aqueous solutions of ions selected from ions found in seawater, and pollutants encountered in the environment where the metals and/or alloys will be used, and combinations thereof. In accordance with some aspects of the invention, solutions of sodium chloride are preferred.

As shown in FIG. 2, the ZRA GACK detection instruments of the invention have a configuration in which the two discrete anode and cathode half-cells are connected by a salt bridge 220. This configuration allows the time-resolved galvanic current and potential of the ZRA-coupled anode and cathode to be examined during humidity cycling or other varied environmental conditions, in the absence of reaction product interference. The ionically-conductive salt bridge allows counter-flow transport of cations and anions to balance out the measured current at the anode and cathode. This configuration permits galvanic corrosion kinetics to be measured in isolated droplets and thin electrolyte films, isolated from the effects of the formation of corrosion products 215 and consumption of the ions in the droplets/films. As a result, the galvanic corrosion is controlled by oxygen reduction reactions, not anode reactions. The transport of cations from the salt bridge 220 to the catholyte 213 ensures charge balance for generated hydroxide ions. Aggressive anions are transported to the anolyte 212, replenishing any consumed by precipitation reactions or "freezing out." Precipitation reactions occur only on the anode 202 by hydrolysis reactions that acidify the anolyte 212 on the anode 202, creating corrosion products 215, ensuring continued dissolution.

The salt bridge can be made from a number of different materials known in the field of electrochemistry. Generally, the salt bridge includes a non-conductive outer sleeve (i.e., glass or polymer), and an ionically-conductive, inert inner matrix (i.e., gels, polymers, agar, string, paper, cotton, frits loaded with aqueous solutions such as sodium chloride, potassium chloride, potassium nitrate, etc.). The electrolytes of the inner matrix do not interact with the metals/alloys used in the half cells, and the anions and cations should exhibit similar conductivity. The ends 222, 223 of the salt bridge may be microscopic, such as pulled micropipette tips, or macroscopic in size. In some aspects of the invention, the salt bridge is an agar salt bridge loaded with sodium chloride. In this instance, sodium cations migrate to the cathode 203 to balance out the generation of hydroxide ions, while chloride ions move to the anode 202 for charge balance with liberated metal anions or protons generated from hydrolysis reactions, in response to the liberated metal anions.

Figure 3:
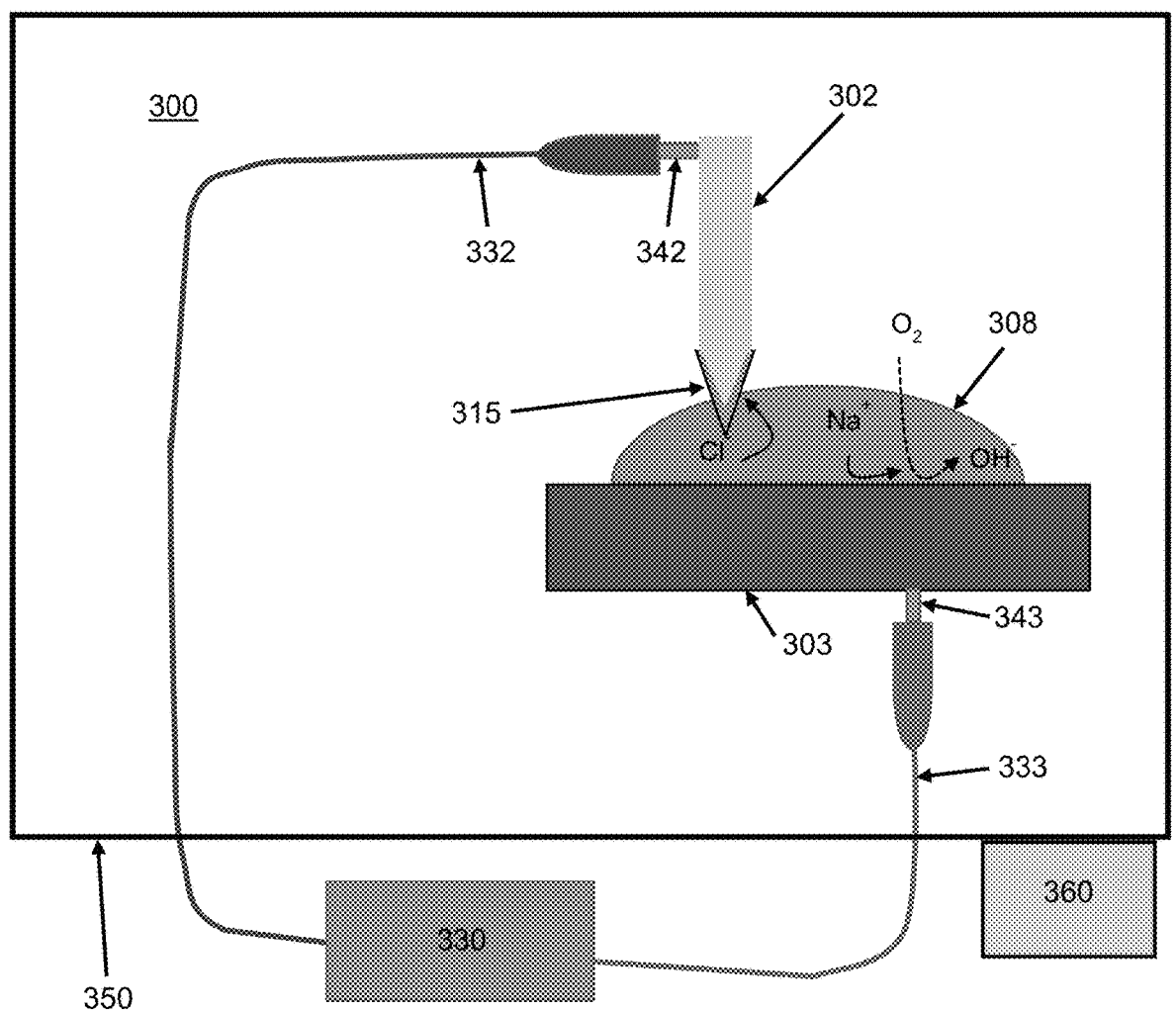
FIG. 3 depicts a ZRA galvanic atmospheric corrosion cell in which the oxidation and reduction reactions occur within the same droplet, permitting the effects of corrosion product formation and consumption of reacting species to be observed.

By removing the salt bridge from the configuration shown in FIG. 2, the ZRA galvanic atmospheric corrosion cell 300 can be formed, as shown in FIG. 3. The ZRA galvanic atmospheric corrosion cell 300 may be used to provide additional data regarding the corrosion reaction, such as the effects of corrosion product 315 formation and the rate of consumption of reacting species. An electrolyte solution droplet or thin film 308 is provided on a cathode material 302. The electrolyte solution 308 is contacted by an anode 302, which may be configured to have a fine tip or other shape that permits the anode 302 to contact the electrolyte solution 308 with minimal disturbance. Without the half-cell separation achieved by the salt bridge, information regarding formation of corrosion products 315 may be obtained, and the rate of consumption of reacting species may be measured. The electrochemical energy may be measured at the anode 302 and cathode 303 by electrically connecting them to a commercially-available potentiostat or ZRA apparatus 330, for example, the Gamry Instruments Reference 600™ (potentiostat available from Gamry Instruments, Warminster, Pa.). Electrically-conductive cables 332, 333 may be used to attach the potentiostat to the anode and cathode, for example, using alligator clips, clamps, or other suitable attachment mechanisms 342, 343.

When the ZRA galvanic corrosion cell configuration shown in FIG. 3 is used, the anode material is preferably provided as a mechanically-polished fine tip anode 302 in order to contact the electrolyte droplet 308 with minimal disturbance. This approach examines the extent of damage that may be caused by a single droplet of an electrolyte solution 308, i.e., a fixed salt loading. This configuration beneficially demonstrates the influence of reaction product interactions on the overall process, as opposed to the continuous ion source and partitioning of reaction products characterized by the ZRA GACK detection instrument shown in FIG. 2.

The measurements obtained using both the ZRA GACK detection instrument and the ZRA galvanic atmospheric corrosion cell can be further controlled by a carrying out the corrosion reactions in a chamber 250, 350 that provides control environmental conditions, such as lighting, atmospheric composition, temperature, and relative humidity. Control may be provided by using an environmental controller 260, 360. Suitable environmental chambers and controllers are commercially available, including, but not limited to, those manufactured by Electro-Tech Systems, Inc. (Glenside, Pa., USA). In order to further recreate actual operating conditions for the structural members being tested, airborne pollutants found in the environment may be introduced into the atmosphere in which the ZRA GACK detection instrument is operated.

The ZRA GACK detection instrument and ZRA galvanic atmospheric corrosion cell of the invention are capable of being adapted for use in a variety of test conditions, according to the materials being tested and the atmospheric conditions of interest. The anode and cathode can be prepared in several ways that are known to those skilled in the art of corrosion science. This includes the use of different surface finishes and treatments, such as primers, inhibitors, thin and thick polymer coatings. They may also have different geometries, or be masked to expose a limited area of the anode or cathode. The ZRA GACK detection instrument and ZRA galvanic atmospheric corrosion cell configurations of the invention also beneficially allow for more rapid scanning of materials and environmental conditions, and are amenable to analysis of corrosion in small volumes, such as droplets and thin films.

The advantages of the ZRA GACK detection instrument and ZRA galvanic atmospheric corrosion cell of the invention include the ability to be used in methods for monitoring galvanic corrosion rates for metal and/or alloy couples independent of reaction product interactions, which can drastically alter reaction rates by modification of the surface or consumption of aggressive halides. This feature is important for rapid survey of environmental conditions and materials that are not possible in a dynamic chemical environment. This is particularly important for atmospheric corrosion, as changes in the environment due to the diurnal cycle (relative humidity (RH) and temperature), climate, atmospheric chemistry, and precipitation lead to a wide range of conditions.

The ZRA GACK detection instrument may be used to examine steady-state behavior with the use of a micropipette salt bridge and the other coupled two metals directly into a sub-microliter volume of electrolyte. The ZRA GACK detection instrument attains a steady state due to the flow of ions from the salt bridge.

The ZRA galvanic atmospheric corrosion cell displays a rapid drop in galvanic corrosion current. This can be, for example, a result of anion consumption by the corrosion product growing on the anode by EDS. This also reduces the remaining water significantly, possibly down to adsorbed layers, as no salt is available to promote deliquescence. Conversely, on the cathode side, the production of OH— is balanced by Na+, which may interact further with dissolved species such as $CO_2$. The end products lead to drying on the cathode, since ions were consumed. The galvanic couples start out under cathodic control, and the rapid reduction in current opens the possibility for anode limitations to quickly take over. This system continually changes from the start of the measurement, and is coupled to area expansion.

Methods for measuring galvanic atmospheric corrosion current density include providing an anode, a cathode, and separated electrolytes at the anode and cathode. A salt bridge is provided in which one end of the salt bridge that contacts the electrolyte at the anode, and the other end of the salt bridge contacts the electrolyte at the cathode, forming a galvanic couple. A zero resistance ammeter is provided, and is electrically connected to the anode and cathode. The corrosion current density of the separated electrolytes galvanic couple is measured using the zero resistance ammeter, and is compared to an intersection point of polarization scans obtained by a zero resistance ammeter connected to the anode and cathode in the absence of the separated electrolytes. When the corrosion current density of the separated electrolytes galvanic couple is higher than the intersection point of the polarization scans, the presence of the electrolyte causes accelerated corrosion of the anode.

The methods of measuring galvanic atmospheric corrosion current density may further include measuring current density by providing the anode and the cathode in contact with a single electrolyte. A zero resistance ammeter is provided, and is electrically connected to the anode and cathode. The corrosion current density of the single electrolyte galvanic couple is measured using the zero resistance ammeter, and is compared to the corrosion current density of the separated electrolytes galvanic couple. When the corrosion current density of the single electrolyte galvanic couple is higher than the corrosion current density of the separated electrolytes galvanic couple, corrosion reaction product accumulation in the single electrolyte causes accelerated corrosion of the anode.

In some aspects of the invention, corrosion rate measurements obtained using the ZRA galvanic atmospheric corrosion cell serve as a baseline to permit greater understanding of the results from ZRA GACK detection instrument test results, because they allow reaction product interactions, by removing the salt bridge. This approach can also be used to observe changes in the electrochemical potential of the working electrode. These potential changes can result in large kinetic changes and provide significant insight on how atmospheric conditions impact thin film corrosion.

The ZRA GACK detection instrument and ZRA galvanic atmospheric corrosion cell of the invention may be used together in accordance with the presently-preferred methods for monitoring galvanic corrosion rates for alloy couples. These methods may be combined to serve as a baseline to permit greater understanding of ZRA test configurations that allow reaction product interactions.

The ZRA GACK detection instrument and ZRA galvanic atmospheric corrosion cell of the invention can also beneficially be used to observe changes in the electrochemical potential of the working electrode. These potential changes can result in large kinetic changes, and provide significant insight into how atmospheric conditions impact thin film corrosion.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

Example 1. Experimental Methods

All experiments utilized ⅛" thick 1"×1" or 2"×2" coupons of UNS A97075 (AA7075-T6, anode) and UNS S13800 (CRES 13-8, cathode) cut from panel and bar stock, respectively. Coupons were surface ground to 600 grit SiC, rinsed with distilled water, cleaned with ultrasound, and dried with nitrogen just prior to electrochemical measurements. The configuration for collection of droplet polarization curves includes a micromanipulator to position the tip of a micropipette salt bridge, which housed a counter and reference electrode, into a saline droplet resting upon a coupon. Micromanipulators attached to an aluminum breadboard housed in a temperature and humidity controlled environmental chamber were utilized for all examples. During polarization scans the environmental chamber was held at 297 K and 80% RH. The aluminum alloy was anodically polarized at 0.167 mV/sec from −0.02 V vs. $E_{OC}$ to −0.6 $V_{SCE}$. The stainless steel was cathodically polarized at 0.167 mV/sec from 0.02 V vs. $E_{OC}$ to −1.4 $V_{SCE}$.

Example 2. ZRA GACK Detection Instrument

A ZRA GACK detection instrument was constructed as shown in FIG. 2. This configuration allows micro-droplets on each electrode of a galvanic couple to be physically separated, while being electrolytically connected through a salt bridge. Micropipettes were used to interface the small volumes, 0.5 of these electrolytes with both electrodes, with a reference electrode contained in the pipette body on the cathode side. The two micropipettes were then electrolytically connected via a saturated NaCl agar filled PTFE tube salt bridge, and electrically connected through the ZRA of the potentiostat.

All micro-pipettes were fabricated from standard borosilicate glass. Pasteur pipettes using a Nashirige PC-1 pipette puller to create tips with 20 μm diameters. The pipettes were then silanized with N,N-dimethyltrimethylsilylamine at 473 K for 2 hours to make the glass hydrophobic for agar tip stability. Ionic exchange through the tip opening was controlled using NaCl saturated agar and the pipette was filled with saturated NaCl to reduce resistive losses. Both the counter electrode, a Pt wire, and a fritted Ag/AgCl reference electrode were inserted in the body of the pipette.

Example 3. ZRA GACK Detection Instrument Corrosion Current Measurements

Figure 5:
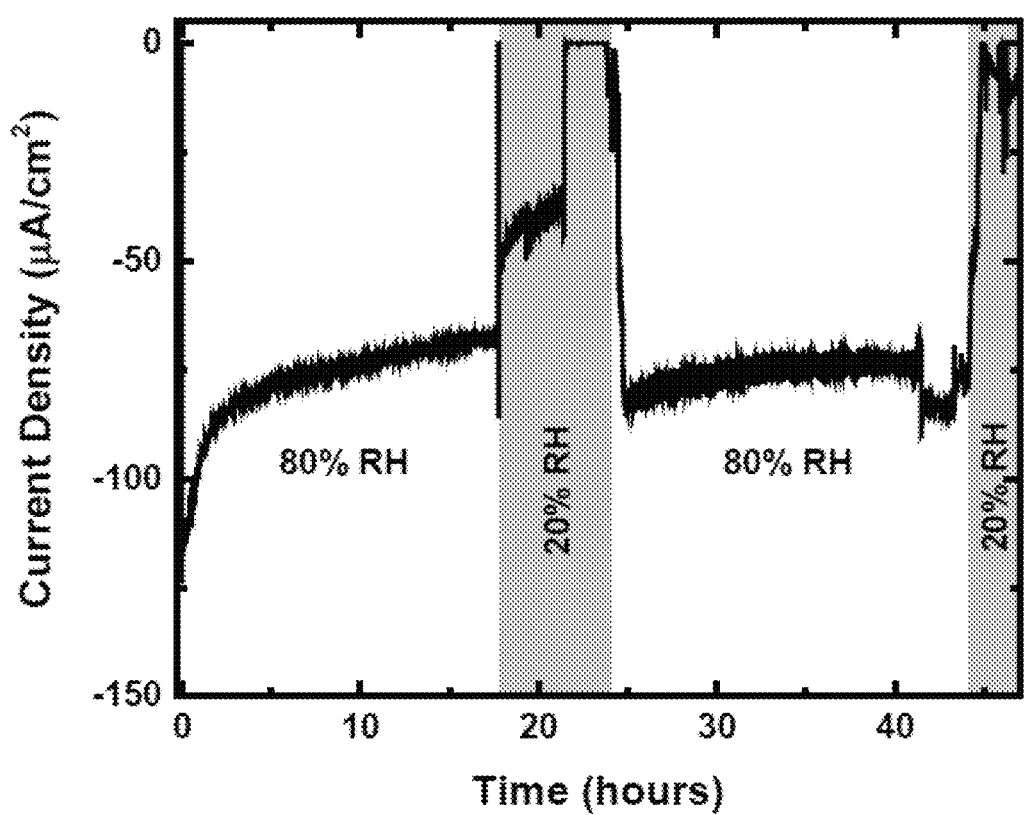
FIG. 5 depicts ZRA galvanic current transient measurements for two 0.5 µl NaCl droplet half cells on UNS S13800 and UNS A97075, connected by a micro-pipette salt bridge.

The ZRA GACK detection instrument configuration was designed to complement droplet polarization curves with a technique that allows more rapid scanning of materials and environmental conditions. The ZRA corrosion current measurement for UNS S13800 (stainless steel, grade 13-8) and UNS A97075 (aluminum 7075 alloy) with this configuration during wet/dry cycling is shown in FIG. 5. The galvanic current density was negative as the UNS S13800 coupon was taken as the working electrode. The initial current density peaks near $-124$ $\mu A/cm^2$, followed by a rapid current decrease and relative stabilization at longer times. The humidity drop to 20% RH resulted in rapid electrolyte thinning, and at some points loss of contact between the micro-pipette salt bridge and droplet near 18 hours. During dry conditions the galvanic current was suppressed, but was resuscitated to previous values upon re-wetting at 80% RH.

These results support predicted corrosion rate values for galvanic couples from droplet polarization scans. They indicate that kinetic changes can be observed in the galvanic couple when environmental conditions are varied over large differences through efflorescence and deliquescence points of salts. These results also indicate that changes in the electrolyte occur which impact kinetics even in the absence of reaction product accumulation from the opposing electrode.

Of the two alloys, the UNS A97075 was observed to wet more readily, and have a larger wetted area for the same droplet volume. As the experiment progressed, the cathode wetted area expanded quickly and the droplet diameter was observed to be nearly twice the original diameter after only 12 minutes. After 16 hours of coupling, the cathode retained the core droplet area, but was surrounded by micro-droplets and larger coalesced micro-droplets that significantly expanded the wetted region of the cathode. This was consistent with previous results examining larger droplets, and is understood to emerge from hydroxide species generated from oxygen reduction reactions (ORR) near the edge of the droplet. The anode wetted extensively, with cross-section thinning so extensive that no defined droplet remained at 80% RH, only complete wetting of the surface. Drying generated precipitates on the aluminum anode tip that formed a visible coating.

Example 4. Polarization Scans

Figure 4:
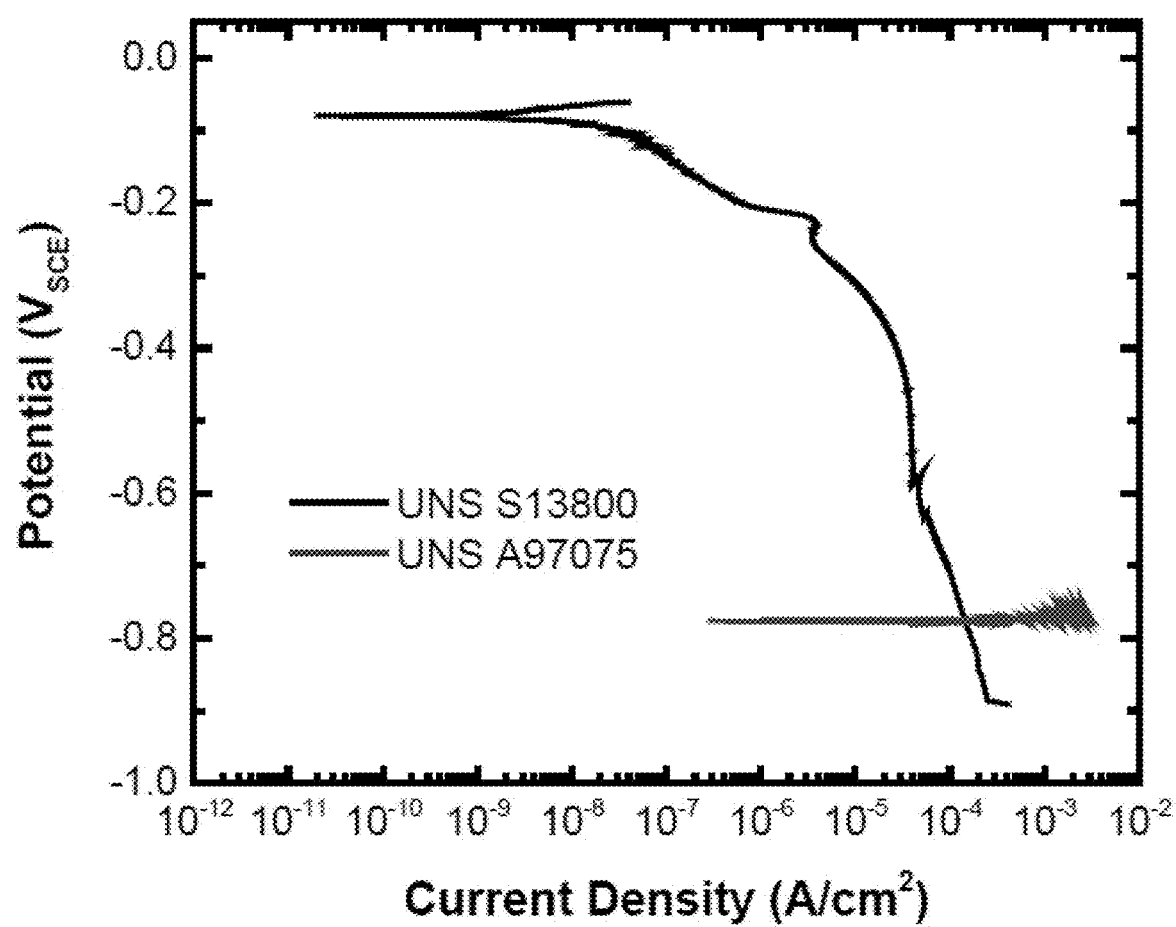
FIG. 4 depicts polarization curves for UNS S13800 and UNS A97075 after 18 hour open circuit potential holds in an environmental chamber held at 297 K and 80% RH.

Polarization scans for UNS 513800 and UNS A97075 at 297 K and 80% RH are shown in FIG. 4. The scans were iR corrected with resistance values determined from equivalent circuit fittings of electrochemical impedance measurements performed prior to the galvanic corrosion measurement. The intersection point between anodic and cathodic scans, which was used as a predictor for corrosion current and potential of galvanic couples, is located at 145 $\mu A/cm2$ and $-0.777$ VSCE. Although the UNS A97075 polarization was relatively featureless appearing as a nearly horizontal line, key attributes to note include the small Tafel slope and large exchange current that suggest this galvanic couple was largely under cathodic control and the presence of appreciable local corrosion, respectively. The polarization scan for UNS A97075 is more complex and displays an activation region ($-0.1$ to $-0.4$ VSCE), a diffusion limited region ($-0.4$ to $-0.6$ VSCE) and droplet geometry changes ($<-0.6$ VSCE). The latter was a consequence of greater oxygen reduction near the edge of the droplet and oxygen reduction within the adsorbed water layer adjacent to the primary droplet. This behavior resulted in micro-droplet formation around droplets with active corrosion.

Example 5. ZRA Galvanic Atmospheric Corrosion Cell

The ZRA galvanic atmospheric corrosion cell is depicted in FIG. 3. In this configuration, the anode and cathode were placed in intimate contact with a single droplet of an electrolyte, where the droplet was placed on the cathode and the anode made contact on the top of the droplet. This system was developed to electrochemically examine galvanic atmospheric corrosion in small electrolyte volumes. The ZRA current transient measured in FIG. 6 corresponds to configuration in FIG. 3. The galvanic current density peaked at $-699$ $\mu A/cm^2$.

The initial 4 M NaCl droplet with contacting electrodes, prior to ZRA galvanic coupling, had decreased in size after one hour with evidence of microdroplets appearing around the original droplet area and the anode exhibiting a corrosion zone, indicated by the dark color, on the anode tip. After 18 hours of galvanic corrosion, no evidence of liquid electrolyte remained, and the corrosion zone on the anode had grown and the electrodes appeared to be linked by solid corrosion product.

Example 6. Chloride Consumption Measurement

The galvanic corrosion current at early times and the stable periods thereafter, barring humidity effects, indicated permanent changes in the half cells are occurring after coupling. These changes reached limiting values that allowed for a pseudo-steady-state condition. In the ZRA GACK detection instrument configuration of FIG. 2, contact effects between the metals were eliminated and depolarization could be solely attributed to changes in the material surface and/or electrolyte. The primary reaction occurring on the cathode side was the oxygen reduction reaction, which generated hydroxide ions and a positive/negative flow of sodium/chloride ions, respectively, from the salt bridge to the catholyte. Conversely, oxidation on the anode led to corrosion product build up and acidification with the generation of protons, H+, and a positive/negative flow of chloride/sodium ions, respectively, into the anolyte to maintain charge neutrality. From this perspective, cathode depolarization and decreased corrosion rates could arise from ion transport resistance through the salt bride, corrosion product film on the anode, and pH shifts on the cathode.

Figure 6:
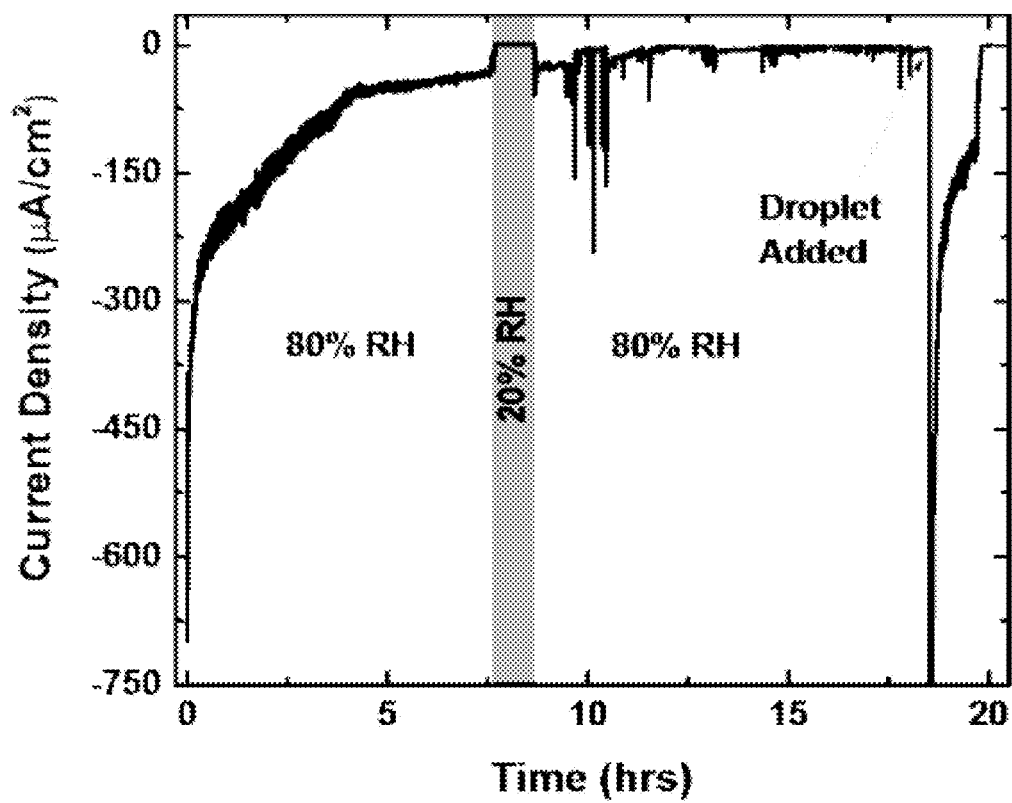
FIG. 6 depicts ZRA galvanic current transient measurements for UNS S13800 and UNS A97075 in a single 0.5 µl NaCl droplet at 297 K and the indicated relative humidity. The current decays until a new NaCl drop is added to the system.

One feature of the corrosion test cell that was not predicted is the precipitous decay in corrosion current (FIG. 6) captured in the single droplet galvanic corrosion cell design (FIG. 3). This finding emerged from a simple galvanic cell containing only anode, cathode and electrolyte in a ZRA configuration for fixed, small volumes of electrolyte. Previous work tied this behavior to aggressive anion consumption, in this case Cl—, with a clear dependence on pH and ambient $CO_2$ as well. Briefly, this relationship was correlated to the neutralizing and buffering ability of protons and carbonic acid, respectively, which pushed the solubility limits of various aluminum species in solution closer to a minimum promoting precipitation of corrosion product and concomitant consumption of Cl— into the precipitate. In FIG. 6, the additional 0.5 $\mu L$ of 4 M NaCl (at 18 hrs) was shown to reset the corrosion current allowing the subsequent current decay process to recommence. Moreover, the consumption rate of chloride for the system was ~58 mC/µmol Cl⁻.

Energy dispersive X-ray spectroscopy (EDS) was used to explore chloride consumption further, and indicated that the accumulated precipitation product is comprised of Al, O, Na, and Cl. Although Cl is present, it is not concentrated in the corrosion product. Farther out from the contact point, Al was no longer present at a detectable level. It was also observed that the electrolyte dried out as two separate phases, stick-like structures comprised of sodium oxide and particles that primarily contain sodium chloride. No chloride was detected in the precipitate at the furthest distance from the contact site, only sodium, oxygen, carbon and the stainless steel contents. The high level of carbon present in the residue, 36 at % at the droplet edge vs. 10 at % near the tip contact point, supported the neutralization reaction between sodium hydroxide and carbonic acid that produced sodium carbonate, and was more dominant near the droplet edge. These results are congruent with EDS spot analysis of coupled coupons illustrating that Na+1 migration provides charge balance for OH— generated by oxidation-reduction reactions.

The SEM micrograph and composite EDS map of the AA7075-T6 anode tip captured Al, the oxide layer, accumulation of Na ions on the very tip and chloride ions dispersed throughout the oxide. The sodium ions are present only at the tip as the tip was in contact with the electrolyte. Conversely, the chloride ions accrue primarily in thick oxide scales that appear more insulating from the contrast with the bulk of the tip, which suggest greater charging. This is consistent with chloride migration to the anode and consumption by the oxide.

As a whole, the compositional mapping and corrosion current measurements corroborate the fact that galvanic atmospheric corrosion in droplets is highly dependent upon chloride loading because it is incorporated into the growing corrosion product. Chloride consumption is promoted by the positive surface charge below the isoelectric point, pH 9-9.5, resulting in electrostatic attraction of chloride to the surface. This process could lead to entrapment in a precipitation growth process, while also increasing the resistivity of the film by chloride occupation of oxygen vacancies, which decreases carrier motion and conductivity. The localized increased film resistance also leads to greater iR (i=current, R=resistance) drop across the film, which results in reduced or negligible corrosion rates in these areas. Surface potential distributions that arise from chloride induced resistance variations could consequently produce local regions of active corrosion and corrosion product precipitation that correlate to the oxide thickness variation, charging behavior and chloride distribution.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A zero resistance ammeter (ZRA) galvanic atmospheric corrosion kinetics (GACK) detection instrument, comprising:
    an anode;
    a cathode;
    an electrolyte provided at the anode;
    an electrolyte provided at the cathode;
        wherein the electrolyte at the anode and the electrolyte at the cathode are provided as droplets or thin films;
    a salt bridge electrolytically-connecting the electrolyte at the anode with the electrolyte at the cathode; and
    a ZRA electrically-connecting the anode and the cathode.

2. The ZRA GACK detection instrument of claim 1, wherein the anode and cathode comprise metals selected from the group consisting of aluminum, titanium, nickel, steel, cobalt, chromium, and alloys thereof.

3. The ZRA GACK detection instrument of claim 1, wherein the anode comprises aluminum or an alloy thereof, and the cathode comprises stainless steel.

4. The ZRA GACK detection instrument of claim 1, wherein the electrolyte provided at the anode has the same composition as the electrolyte provided at the cathode.

5. The ZRA GACK detection instrument of claim 1, wherein the electrolyte comprises anions and cations present in an environment to which the anode and cathode are exposed.

6. The ZRA GACK detection instrument of claim 1, wherein the electrolyte at the anode and the electrolyte at the cathode comprise aqueous solutions of ions present in seawater.

7. The ZRA GACK detection instrument of claim 1, wherein the salt bridge comprises a non-conductive outer sleeve, an ionically-conductive, inert inner matrix, and an aqueous solution of ions.

8. The ZRA GACK detection instrument of claim 1, wherein the salt bridge is an agar salt bridge loaded with a solution of sodium chloride.

9. The ZRA GACK detection instrument of claim 1, further comprising a chamber surrounding the ZRA GACK detection instrument that provides control over environmental conditions selected from the group consisting of lighting, atmospheric composition, temperature, relative humidity, and combinations thereof.

10. A method for measuring galvanic atmospheric corrosion current density, comprising:
    providing an anode, a cathode, and separated electrolytes at the anode and cathode;
    providing a salt bridge in which a first end of the salt bridge contacts the electrolyte at the anode, and a second end of the salt bridge contacts the electrolyte at the cathode, forming a separated electrolytes galvanic couple;
    providing a zero resistance ammeter that is electrically connected to the anode and cathode;
    measuring corrosion current density of the separated analytes galvanic couple using the zero resistance ammeter; and
    comparing the corrosion current density to an intersection point of polarization scans obtained by a zero resistance ammeter connected to the anode and cathode in the absence of the separated electrolytes,
        wherein when the corrosion current density of the separated electrolytes galvanic couple is higher than the intersection point of the polarization scans, the presence of the separated electrolytes causes accelerated corrosion of the anode as compared to corrosion of the anode in the absence of the electrolyte.

11. The method of claim 10, further comprising:
providing the anode and cathode in contact with a single electrolyte having the same composition as the separated electrolytes, forming a single electrolyte galvanic couple;
electrically connecting the zero resistance ammeter to the anode and cathode;
measuring corrosion current density of the single electrolyte galvanic couple using the zero resistance ammeter; and
comparing the corrosion current density of the separated electrolytes galvanic couple to the corrosion current density of the single electrolyte galvanic couple,
wherein when the corrosion current density of the single electrolyte galvanic couple is higher than the corrosion current density of the separated electrolytes galvanic couple, corrosion reaction product accumulation in the single electrolyte causes accelerated corrosion of the anode as compared to corrosion of the anode in the absence of the corrosion reaction product.

12. The method of claim 10, wherein the galvanic atmospheric corrosion current density measurements in the presence of the electrolyte are obtained for multiple different anode and cathode materials forming galvanic couples.

13. The method of claim 12, wherein an anode material and a cathode material forming a galvanic couple that exhibits a lower galvanic atmospheric corrosion current density measurement in the presence of the electrolyte is selected for use in a structure to be exposed to the electrolyte.

14. A zero resistance ammeter (ZRA) galvanic atmospheric corrosion kinetics (GACK) detection instrument, comprising:
an anode;
a cathode;
an electrolyte provided at the anode;
an electrolyte provided at the cathode;
wherein less than an entire surface of the anode or the cathode is exposed to the electrolyte at the anode or cathode;
a salt bridge electrolytically-connecting the electrolyte at the anode with the electrolyte at the cathode; and
a ZRA electrically-connecting the anode and the cathode.

15. The ZRA GACK detection instrument of claim 14, wherein the anode and cathode comprise metals selected from the group consisting of aluminum, titanium, nickel, steel, cobalt, chromium, and alloys thereof.

16. The ZRA GACK detection instrument of claim 14, wherein the anode comprises aluminum or an alloy thereof, and the cathode comprises stainless steel.

17. The ZRA GACK detection instrument of claim 14, wherein the electrolyte provided at the anode has the same composition as the electrolyte provided at the cathode.

18. The ZRA GACK detection instrument of claim 14, wherein the electrolyte comprises anions and cations present in an environment to which the anode and cathode are exposed.

19. The ZRA GACK detection instrument of claim 14, wherein the electrolyte at the anode and the electrolyte at the cathode comprise aqueous solutions of ions present in seawater.

20. The ZRA GACK detection instrument of claim 14, wherein the salt bridge comprises a non-conductive outer sleeve, an ionically-conductive, inert inner matrix, and an aqueous solution of ions.

21. The ZRA GACK detection instrument of claim 14, wherein the salt bridge is an agar salt bridge loaded with a solution of sodium chloride.

22. The ZRA GACK detection instrument of claim 14, further comprising a chamber surrounding the ZRA GACK detection instrument that provides control over environmental conditions selected from the group consisting of lighting, atmospheric composition, temperature, relative humidity, and combinations thereof.

23. A zero resistance ammeter (ZRA) galvanic atmospheric corrosion kinetics (GACK) detection instrument, comprising:
an anode;
a cathode;
an electrolyte provided at the anode;
an electrolyte provided at the cathode;
a micro-pipette salt bridge electrolytically-connecting the electrolyte at the anode with the electrolyte at the cathode; and
a ZRA electrically-connecting the anode and the cathode.

* * * * *